July 5, 1966  D. L. BEEBE ETAL  3,259,210
LUBRICATION PUMP
Filed April 16, 1964  2 Sheets-Sheet 2

INVENTORS
DONALD L. BEEBE
ERNEST B. GARDOW
BY Norman Friedland
ATTORNEY

United States Patent Office 3,259,210
Patented July 5, 1966

---

3,259,210
LUBRICATION PUMP
Donald L. Beebe, West Granby, and Ernest B. Gardow, Granby, Conn., assignors to United Aircraft Corporation, East Hartford, Conn., a corporation of Delaware
Filed Apr. 16, 1964, Ser. No. 360,336
4 Claims. (Cl. 184—6)

This invention relates to lubrication systems and particularly to the construction of a self-contained lubrication system adapted for use in gear boxes and the like and is an improvement over the lubrication system disclosed and claimed in U.S. Patent No. 3,126,980 granted on March 31, 1964, to Philip E. Barnes and Norman B. Newton.

As was disclosed in the 3,126,980 patent supra, a beveled gear was so constructed as to internally contain a cavity for pumping fluid directed thereto from a reservoir which fluid was then transmitted to a stationary transfer bearing and sufficiently pressurized to be distributed to the various parts intended to be lubricated. The construction of the beveled gear was such that it merely contained an arbitrarily shaped cavity portion communicating with drilled radial passages for generating sufficient pressure by centrifugal force. While such an arrangement is satisfactory for several applications, it is unsatisfactory in so far as it failed to develop sufficient pressure for other applications. The present invention contemplates the improvement in the construction of such a beveled gear as described in the 3,126,980 patent supra so as to develop sufficient pressure in order to satisfy the requirements of certain applications. While the present invention is described in connection with a propeller installation, it is to be understood that the invention is not limited thereto and as anyone skilled in the art would appreciate this invention has utility in other areas.

It then can be said that this invention provides positive lubrication to the various parts intended to be lubricated at the expense of only a small weight penalty since it makes use of an existing drive shaft of an impeller and requires the addition of a small lightweight and inexpensive transfer bearing to collect the oil and send it to an oil distributing system within the housing.

The invention consists essentially of the drive shaft and transfer bearing. The hollow drive shaft which transmits power through a right angle gear box to a tail propeller is ported in an area between the bearings and the pinion gear by milling radial slots through the shaft. Oil flows axially into the hollow interior of the rotating shaft and strikes radial vanes which impart a tangential momentum to the fluid such that when the fluid reaches the radial slots it is rotating with the shaft. The radial slots then act as impeller blades and impart the angular and radial velocity to the fluid.

The oil then passes radially through the impeller section and into a groove formed in the outside diameter of the shaft. The groove is intermittent around the periphery of the shaft, with three slots entering each groove but blocked off from adjacent grooves and slots. The volume at the exit of the impeller slots acts as an oil storage reservoir, holding the fluid at tip velocity until ready for release into the diffusor, which is contained within the transfer bearing.

The stationary transfer bearing rides on the rotating shaft and is free to float on the shaft without firm axial or radial constraint. The transfer bearing inside diameter is held to a close radial clearance with respect to the shaft to reduce leakage at the lands provided thereon. The land is preferably constructed from babbitt material. Center of the transfer bearing is undercut slightly over the slotted holes in the shaft to reduce friction and to prevent metal of the lands from being scraped off by the edges of the holes in the shaft. The depth of this undercut is kept to a minimum to prevent random diffusion of the fluid before entering the diffusor.

The tangential velocity of the fluid causes the fluid to exit from the groove in the shaft and enter the diffusor in the transfer bearing. This diffusion action converts the velocity head of the fluid to pressure head in the most efficient manner. The axis of the diffusor in tangent to the axis of the impeller velocity and diffuses in an optimum divergent angle diffusor, then turn the fluid to the radial direction for transmittal to an oil distribution system.

The radial exit tube from the transfer bearing may be mounted on O-seals to prevent oil leakage and to allow some axial and radial freedom to the transfer bearing so that some shaft to transfer bearing to housing misalignment is permissible.

It is therefore an object of this invention to provide a lubrication system as described that is constructed in such a manner as to achieve high pumping efficiency and transfer fluid from a rotational member to a stationary member in a most efficient and optimum manner.

It still is a further object of this invention to provide in a rotating gear a pump construction wherein radial slots are located internally of the gear and leads fluid to a stationary transfer bearing which is constructed to contain a diffusor passage for obtaining optimum pressure recovery.

It still is a further object of this invention to provide a self-contained lubrication system which utilizes existing gearing and mechanism so as to obtain an optimum lubrication system while avoiding increasing the weight and size of the device intended to be lubricated.

It is still a further object of this invention to provide a lubrication system that serves to cool the mechanism being lubricated which system is characterized as being simple to construct, relatively inexpensive to manufacture, yet being capable of rugged use.

Other features and advantages will be apparent from the specification and claims and from the accompanying drawings which illustrate an embodiment of the invention.

Figure 1:
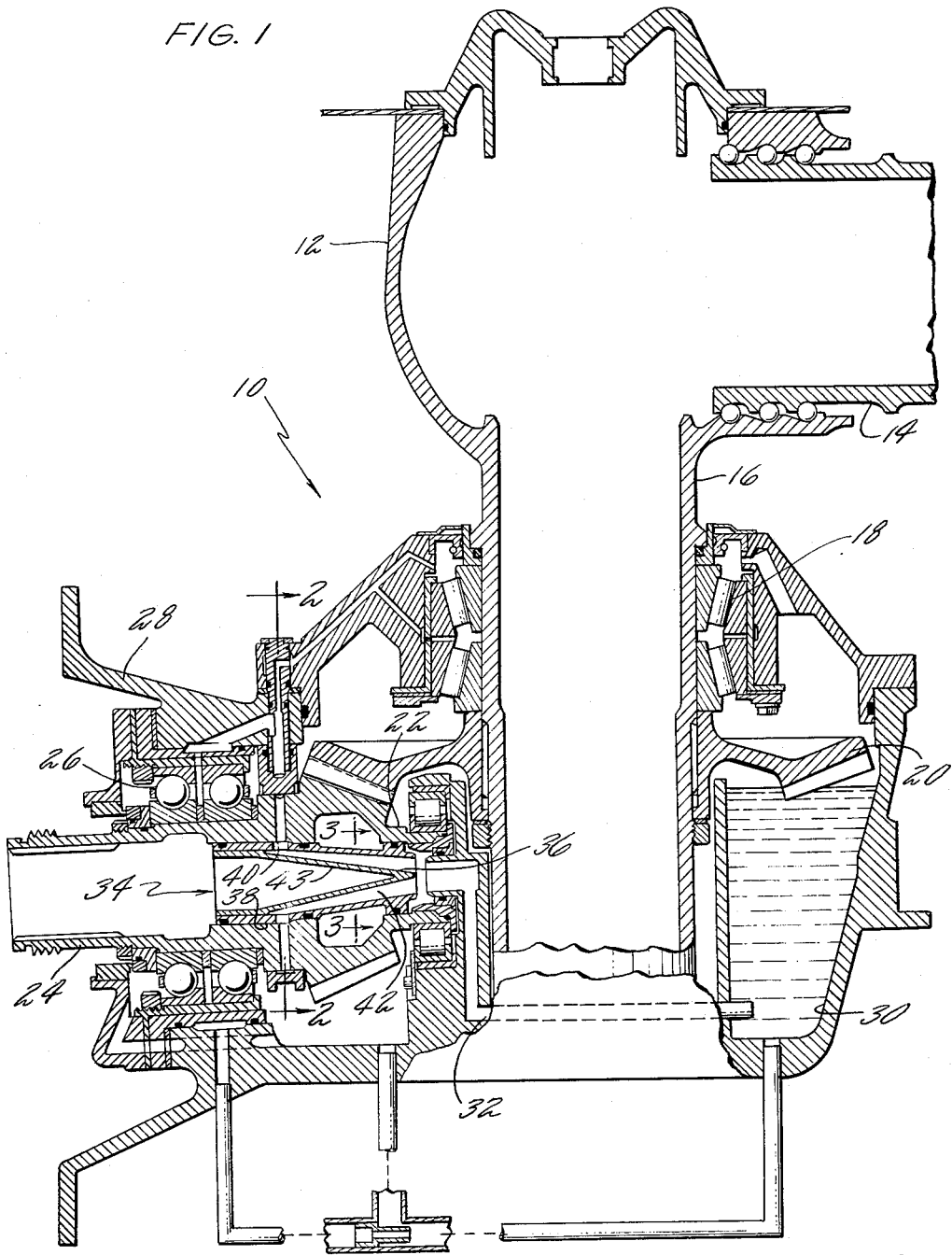
FIG. 1 is a partial schematic and sectional view showing this invention as applied to a right angle driven tail propeller.
Figure 2:
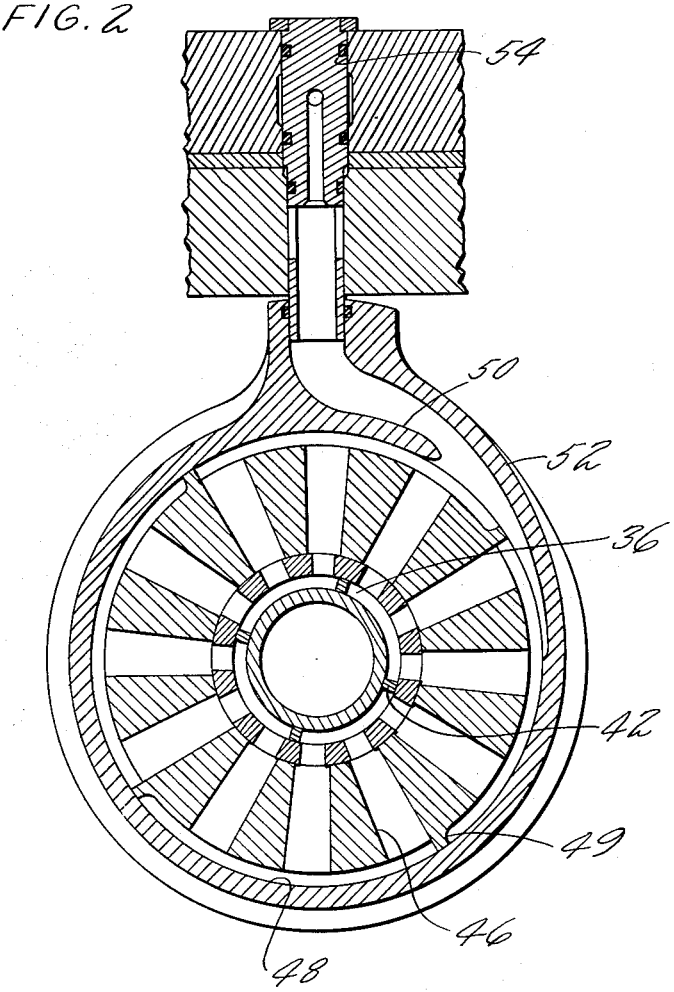
FIG. 2 is a sectional view taken along lines 2—2 of FIG. 1.
Figure 3:
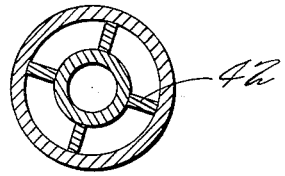

FIG. 3 is a sectional view taken along lines 3—3 of FIG. 1. Referring now particularly to FIGS. 1–3 which show an integral tail propeller and gear box generally indicated by numeral 10. The propeller comprises hub 12 suitably supporting a plurality of horizontally mounted propeller blades 14 (only one of which is shown) and an elongated hollow shaft extending vertically downward. Shaft 16 is rotatably supported by bearings generally indicated by numeral 18. Beveled gear 20 is suitably attached to shaft 16 and is driven by mating beveled gear generally indicated by numeral 22. The beveled gear 22 may contain an integrally mounted horizontally extending shaft 24 which is suitably driven by a power unit not shown. The shaft is supported by bearings 26 in housing 28 and as will be appreciated is rotatable relative thereto.

Reservoir 30 which is formed in housing 28 and arcuately circumscribes shaft 16 serves to retain suitable lubricating fluid which is directed internally of gear 22 via fluid line 32. Fluid issuing from line 32 is directed to the pumping mechanism generally indicated by numeral 34 which is centrally and internally mounted in the combined integral hollow shaft 24 and beveled gear 22.

The pumping assembly comprises an impeller 36, sleeve 38 having radial slots which sleeve is suitably secured to the inner diameter of the hollow shaft 22. The impeller which is force-fitted into the sleeve generally tapers toward the forward end for defining a reduced area portion leading toward the radial slots 40 formed about the periphery of sleeve 38. A plurality of spaced impeller blades 42 secured to the frusto conical support portion 43 of the impeller are suitably disposed adjacent sleeve 38 and serve to impart rotary motion to the axially moving fluid entering into the pumping mechanism. The fluid is then directed to a plurality of radial slots 46. These slots then act as impeller blades and impart an angular and radial velocity to the fluid. The oil then passes radially into groove 48 located at the periphery of the shaft 24. The groove may be divided into four segmental sections by the radially extending lands 49 formed on the outer periphery of the shaft 24. It will be appreciated that in this arrangement three slots are in communication with each groove and that each groove is blocked off from adjacent grooves and slots. These segmental sections at the exit of the impeller slots act as an oil storage reservoir holding the fluid at tip velocity until ready for release into the diffusor indicated by numeral 50 located in the transfer bearing 52. As noted from the drawing, the diameter of diffusor 50 gradually increases in order to obtain maximum pressure recovery when the fluid velocity head is converted to a pressure head in a most efficient manner. Obviously, the axis of the diffusor is tangent to the exit impeller velocity and diffuses in an optimum divergent angle diffusor then turns the fluid to the radial direction for transmitting the fluid through the vertical disposed radial exit tube 54 and then into the various interconnecting lines which lead fluid to the various elements intended to be lubricated and cooled.

It will also be noted that the stationary transfer bearing 52 rides on the rotating shaft and is free to float on the shaft without firm axial or radial constraint. The center of the transfer bearing may be undercut slightly over the slotted holes 46 in the shaft to reduce friction and to prevent metal from being scraped off by the edges of the hole in the shaft. However, this depth of the undercut is kept to a minimum to prevent random diffusion of the fluid before entering the diffusor. The radial exit tube 54 located adjacent the transfer bearing may be mounted on O-seals to prevent oil leakage and to allow some axial and radial freedom to the transfer bearing so that from shaft to transfer bearing to housing, misalignment is permissible.

It should be understood that the invention is not limited to the particular embodiments shown and described herein, but that various changes and modifications may be made without departing from the spirit or scope of this novel concept as defined by the following claims.

We claim:
1. A self-contained lubrication system for a gear box having a rotating gear, an integral hollow shaft projecting rearwardly from said rotary gear, a frusto-conically shaped element centrally disposed in said hollow shaft defining with the inner wall of said gear a cavity portion, radially extending vanes in said cavity portion attached to said frusto-conically shaped element, a plurality of spaced radially extending holes in said hollow shaft communicating with said cavity portion, a stationary transfer bearing surrounding said holes, and in close sliding relation to the outer peripheral surface of said hollow shaft, a plurality of recesses formed in the outer peripheral surface of said hollow shaft communicating with said holes, diffuser means formed in said transfer bearing intermittently registering with said recesses for leading fluid to the members intended to be lubricated, and means for leading fluid to said hollow shaft.

2. A self-contained lubrication system for a gear box having a rotating gear, an integral hollow shaft having an inlet projecting rearwardly from said rotary gear, a frusto-conical shaped element centrally disposed in said hollow shaft defining with the inner wall of said gear a cavity portion, the smallest diameter of the frusto-conically shaped element being located at said inlet, a plurality of spaced radially extending triangular shaped vanes in said cavity portion projecting from said frusto-conically shaped element and being arranged so that the apex of the triangle is at said inlet, a plurality of radially extending spaced holes in said hollow shaft communicating with said cavity portion, an annular member surrounding said holes, and in close sliding relation to said hollow shaft, a plurality of equally spaced recesses formed in the outer peripheral surface of said hollow shaft each of which span a group of said holes, a diffuser formed in said transfer bearing intermittently registering with said recesses for leading fluid to the members intended to be lubricated, and means for leading fluid to said hollow shaft.

3. A self-contained lubrication system for a gear box having a rotating gear, an integral hollow shaft projecting rearwardly from said rotary gear, a frusto-conically shaped element centrally disposed in said hollow shaft, an elongated sleeve in said hollow shaft located between said frusto-conically shaped element and said hollow shaft defining therewith a cavity portion, radially extending vanes in said cavity portion attached to said frusto-conically shaped element, a plurality of radially extending spaced holes in said hollow shaft said sleeve communicating with said cavity portion, a stationary transfer bearing surrounding said holes, and in close sliding relation to the inner bore of said transfer bearing, a plurality of recesses formed in said hollow shaft communicating with said holes, a diffuser formed in said transfer bearing intermittently registering with said recesses for leading fluid to the members intended to be lubricated, and means for leading fluid to said hollow shaft.

4. A self-contained lubrication system for a gear box and the like including a rotating gear, having a rearwardly extending portion, a cavity portion centrally located in said gear and rearwardly extending portion, vanes in said cavity portion adapted to impart a swirl movement to lubricating oil being led thereto, a plurality of spaced radially extending passages in said rearwardly extending portion mounted about the rotating axes thereof for receiving the swirled lubricating oil, a transfer bearing surrounding said rearwardly extending portion, wall means on said rearwardly extending portion adjacent said holes projecting beyond said rearwardly extending portion and terminating adjacent the inner wall of said transfer bearings, the outer peripheral edge of said rearwardly extending portion, the inner wall on said transfer bearing and said wall means defining a plurality of fluid receiving chambers, a passage in said transfer bearing lying substantially tangential to the outer peripheral surface of said rearwardly extending portion selectively communicating with said fluid receiving chambers, and means for leading fluid to said cavity portion.

References Cited by the Examiner
UNITED STATES PATENTS

| | | | |
|---|---|---|---|
| 2,930,448 | 3/1960 | Burnham | 184—6 X |
| 3,126,980 | 3/1964 | Barnes et al. | 184—6 |

LAVERNE D. GEIGER, *Primary Examiner.*

H. BELL, *Examiner.*